United States Patent [19]

Peter et al.

[11] Patent Number: 5,107,427

[45] Date of Patent: Apr. 21, 1992

[54] ERROR MONITORING DEVICE FOR AN ELECTRONIC CONTROL UNIT IN A MOTOR VEHICLE

[75] Inventors: Cornelius Peter, Ottersweier; Karl-Heinrich Prels, Bühlertal, both of Fed. Rep. of Germany

[73] Assignee: Robert Bosch GmbH, Stuttgart, Fed. Rep. of Germany

[21] Appl. No.: 542,249

[22] Filed: Jun. 21, 1990

Related U.S. Application Data

[63] Continuation of Ser. No. 165,276, Feb. 26, 1988, abandoned.

[30] Foreign Application Priority Data

Jun. 30, 1986 [DE] Fed. Rep. of Germany ....... 3621937

[51] Int. Cl.$^5$ .................. G06F 11/30; G06F 15/20
[52] U.S. Cl. ..................... 364/424.03; 364/507; 364/551.01
[58] Field of Search ............ 364/431.01, 431.03, 364/571.01, 506, 507, 571.02, 550, 424.03, 580, 551.01; 324/500, 378; 371/15.1, 48

[56] References Cited

U.S. PATENT DOCUMENTS

| 4,082,988 | 4/1978 | Reime et al. | 318/139 |
| 4,379,255 | 4/1983 | Klose et al. | 318/313 |
| 4,476,529 | 10/1984 | Nakamura et al. | 364/424.05 |
| 4,660,408 | 4/1987 | Lewis | 73/28 |
| 4,773,010 | 9/1988 | Suzuki et al. | 364/424.05 |

Primary Examiner—Parshotam S. Lall
Assistant Examiner—V. Trans
Attorney, Agent, or Firm—Michael J. Striker

[57] ABSTRACT

A monitoring device for an electronic control system in a motor vehicle is advantageously integrated with a digital signal processing device (43) of the system. Economy in terms of components and greater operational reliability safety are attained in that the monitoring of a circuit arrangement of the system is performed sequential plausibility tests of signals that are retrievable at various times from fixed points of one and the same circuit arrangement, which is alternated by the digital signal processing device between an operating state and a test state.

16 Claims, 3 Drawing Sheets

5,107,427

ERROR MONITORING DEVICE FOR AN ELECTRONIC CONTROL UNIT IN A MOTOR VEHICLE

This is a continuation of application Ser. No. 165 276 filed Feb. 26, 1988 now abandoned.

PRIOR ART

The invention is based on a device for monitoring errors in an electronic control system in a motor vehicle, which includes two potentiometers acting as set point value- and actual value transducers, and a programmable digital signal processing device.

German Patent Disclosure Document DE-OS 31 09 638 discloses a monitoring and protection device for control circuit arrangements in motor vehicles, in particular for a so-called electronic gas pedal. This monitoring and protection device provides a special program memory, the output of which communicates with a signal transducer the address inputs of which communicate with potential points, to be monitored, of the control circuit and in which a first output signal is associated with a first group of addresses and a second output signal is associated with a second group of addresses.

However, this known arrangement has a very considerable disadvantage, in that first, a separate analog/digital (A/D) converter, or at least a separate, multiplexable A/D input channel, is needed for each potential point to be monitored; otherwise, the voltages to be monitored cannot possibly be discriminated and stored in memory in the form of binary digit. However, since the separate program memory itself does not perform any computation operations, such as the running of a program-controlled routine for monitoring the potentials for whether they are located between predetermined allowable limits, the separate program memory must be preceded by separate discriminators for signal processing, as symbolized by the discriminator 22 in this patent reference.

In other words, quite contrary to initial expectations, each device requires a great number of additional components in order to be at all capable of performing the described monitoring and protection functions for the regulating loop shown there. These components are expensive, and also run the risk of failing themselves, so that system availability and safety can be increased only to a limited extent.

It is the object of the present invention to propose a monitoring device for an electronic fuel metering device in a motor vehicle which in particular accomplishes the continuous monitoring of the position transducers of such a system with great safety.

A further object of the present invention is in fact to attain such a device with a minimum number of additional components, such that, in particular, it can be advantageously integrated into a modern, fully digital control unit.

These objects are attained in that an existing digital signal processing device, for example a microprocessor, is used for preferably cyclic reconfiguration of a circuit, arrangement provided for data evaluation, from one status providing an operating circuit to another status providing at least one test state, in order to test signal responses derivable therefrom for their presence within to predeterminable limit values and for plausibility with ascertained operating values, using a software routine.

ADVANTAGES OF THE INVENTION

A first advantage of the present invention is that the test signals can be retrieved from a digital signal processing device via the signal routes or devices by which the operating signals are already retrieved. This makes it possible in a simple manner to recognize errors in A/D interfaces or channel receivers of a multiplexed operational A/D converter of a digital control unit.

A second advantage of the device according to the invention is that conclusions as to errors can be made in a very short time. It is unnecessary for the position transducers to remain in a static position of repose for polling. Instead, they can also have a dynamic position in the middle of a regulating operation. In this way, within the briefest possible time after an error occurs, failsafe routines can be called up, which in case of error enable the shutoff or emergency operation of the vehicle in a controlled manner without entering dangerous driving conditions. This aspect is of the greatest possible importance for the utility of fully electronic propulsion control in a motor vehicle.

A further advantage of the invention is considered to be that no separate discriminators whatever are required, and the utilization of the already existing, high-resolution A/D converters, provided for operating signal processing, for monitoring functions as well means the maximum possible savings in terms A/D components and thus a reduction in the number of connections to a corresponding control unit. This is significant because of the trend toward making such control units increasingly smaller in size for use in motor vehicles and embodying them more reliably, and to this end making as many components as possible digital and integrating them on a chip along with a microprocessor.

Advantageous further embodiments of the monitoring device according to the invention are attainable with the provisions disclosed in the dependent claims. A particularly advantageous feature is that the supply of electrical current to the position transducers can also be monitored for error.

DRAWING

Exemplary embodiments of the invention are shown in the drawing and described in further detail in the ensuing description. Shown are:

FIG. 1, a basic circuit diagram of a monitoring and protection device according to the invention;

FIG. 2, a detailed circuit diagram of an advantageously usable regulating device for supply to position transducers; and FIGS. 3 and 4 show a flow chart of program steps of a processor in the device of FIG. 1.

DESCRIPTION OF THE EXEMPLARY EMBODIMENT

Figure 1:
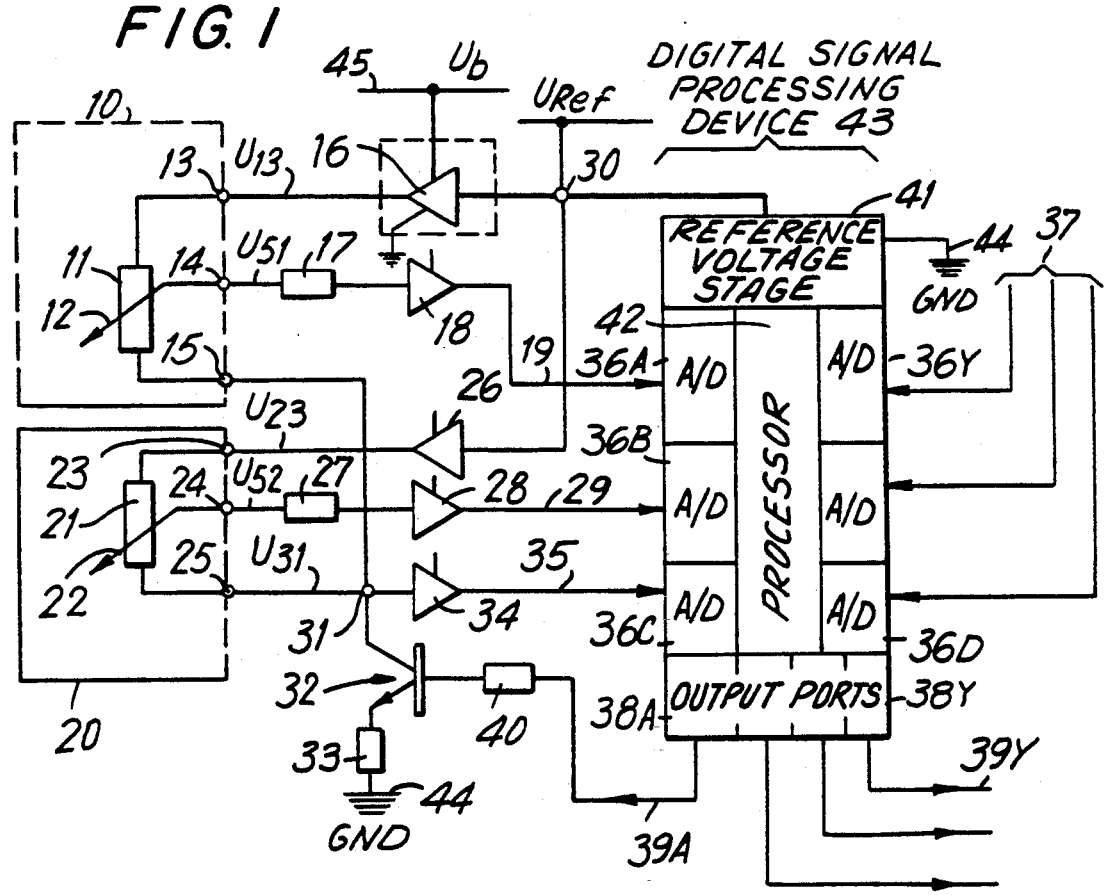

According to FIG. 1, the monitoring and protection device according to the invention for a fuel metering system in a motor vehicle includes a first transducer potentiometer 10 having a resistance path 11, a wiper 12, a current supply terminal 13, a wiper terminal 14 and a ground terminal 15, and a second transducer potentiometer 20 with corresponding components 21–25. The potentiometer 10, as a set-point value transducer, is coupled to the driving pedal, not shown here, of the motor vehicle; the potentiometer 20, as an actual value transducer, is attached in a manner fixed against relative rotation to the throttle valve, not shown here, or to the governor shaft of an injection pump, not shown here.

A node 30, which carries a reference voltage $U_{ref}$, is connected to the input of a first supply controller 16 and a second supply controller 26 and to the reference voltage transfer stage 41 of a digital signal processing device 43. The outputs of the supply controllers 16 and 26 feed into the current supply terminals 13 and 23 of the transducer potentiometer 10 and 20, respectively; the supply controllers are in turn power supplied from the on-board electrical system bus 45. The ground terminals 15 and 25 of the transducer potentiometers 10 and 20 are connected to a node 31, from which the switching path of a controlled semiconductor switch 32 having a resistor 33 to ground 44. The wiper terminal 14 of the transducer potentiometer 10 is connected via a resistor 17 to a first matching amplifier 18, which has a defined gain. A line 19 connects its output to the input part of a first A/D channel 36A of the digital signal processing device 43. Correspondingly, the wiper terminal 24 of the transducer potentiometer 20 is connected via a resistor 27 to a second matching amplifier 28, which likewise has a defined gain. A line 29 connects its output to the input part of a second A/D channel 36B, of the digital signal processing device 43. Finally, the node 31 is also connected to a third matching amplifier 34, which likewise has a defined amplification factor or gain. A line 35 connects its output to the input part of a third A/D channel 36C of the signal processing device 43. The matching amplifiers 18, 28 and 34 are likewise supplied from the on-board system bus 45.

Advantageously, their amplification factors are the same, which contribute to optimal production cost.

Still other A/D channels 36D . . . 36Y are shown, which via input lines 37 can retrieve still other analog vehicle data, which are to be taken into consideration in controlling the fuel metering device.

The arrangement of output ports 38A-38Y, which via output lines 39A-39Y emit control commands, corresponds to the arrangement of the input ports of the A/D channels with respect to the computer or processor 42, which in the conventional manner encompasses at least CPU, RAM, ROM, interrupt and timer functions. For example, via these output lines, either control signals for a conventional electric-motor actuator, or multi-phase pulse groups, can be emitted as triggering pulse trains for a stepping motor, serving as a drive for a final control element. The output port 38A—if necessary with a series-connected resistor 40—communicates with the control electrode of the semiconductor switch 32.

Figure 2:
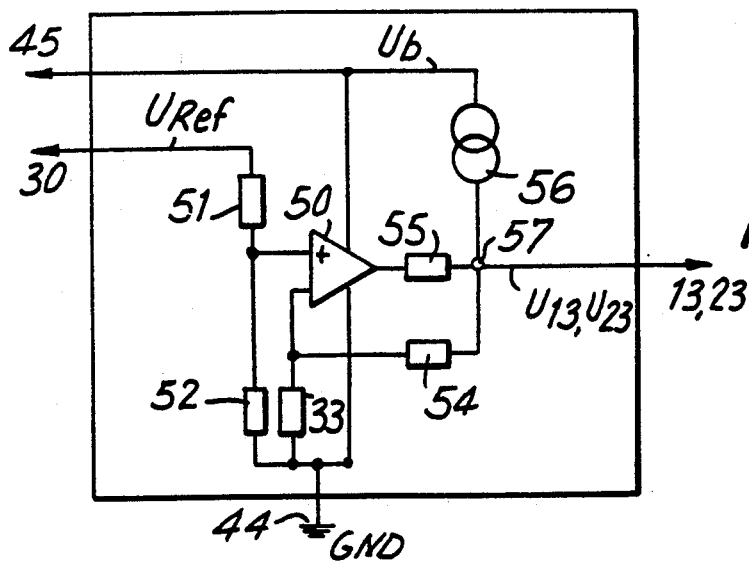

The supply controllers 26 and 16 are preferably identical and have the structure shown in FIG. 2. The positive or non-inverting input of an operational amplifier 50 is applied to a tapping point of a first voltage divider, embodied by resistors 51 and 52, which are connected between ground 44 and the reference voltage terminal 30. The negative or inverting input of the operational amplifier 50 is connected to the tapping point of a second voltage divider, embodied by resistors 53 and 54 and connected between ground 44 and the output node 57. The operational amplifier 50 itself is also, for current supply purposes, connected to ground 44 and to the on-board system bus 45. A current source 56 is also connected between the output node 57 and the on-board system bus 45; the output of the operational amplifier 50 is connected via a resistor 55 to the output node 57, from whence the terminal 13 or 23 of FIG. 1 is supplied.

Figure 3:
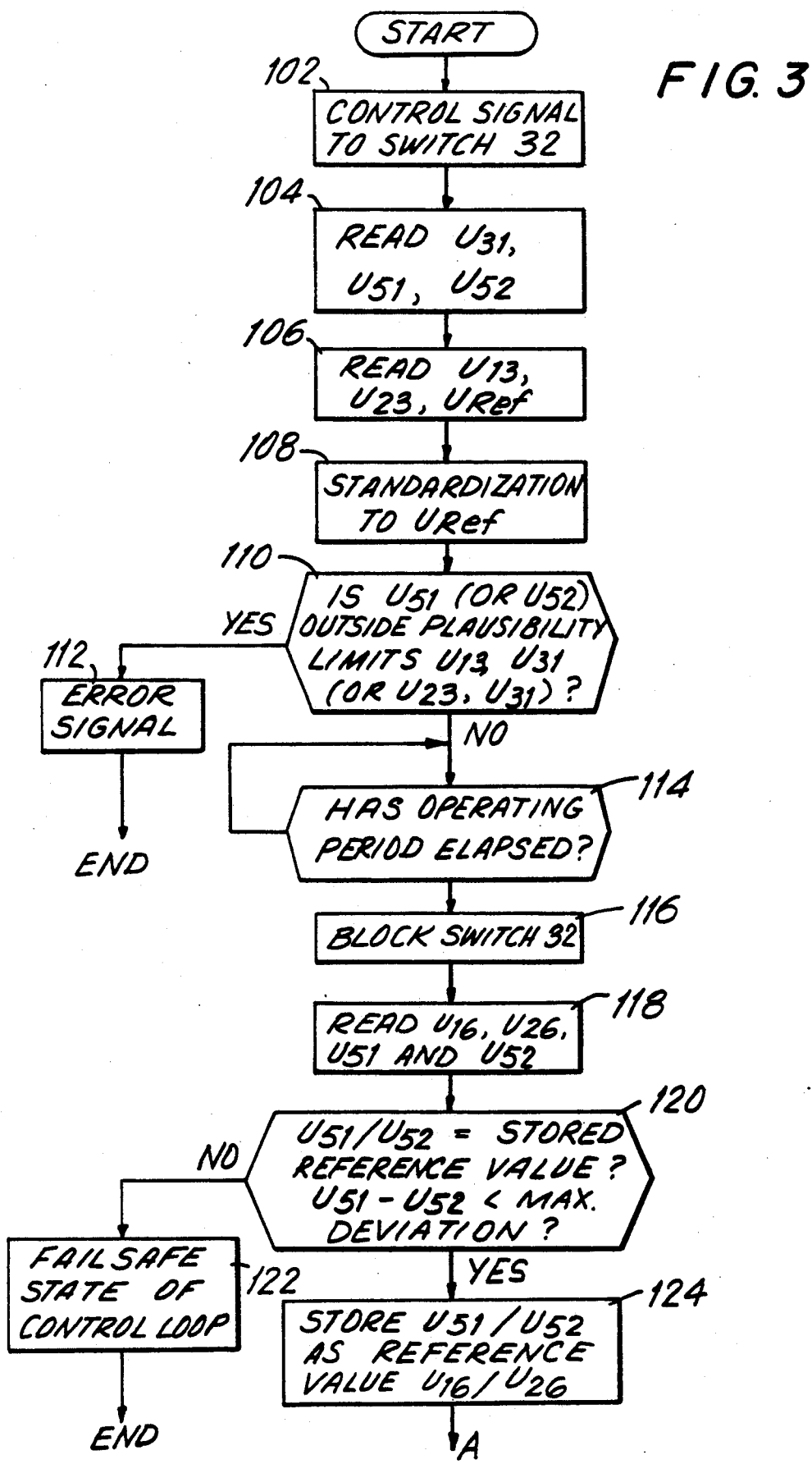
Figure 4:
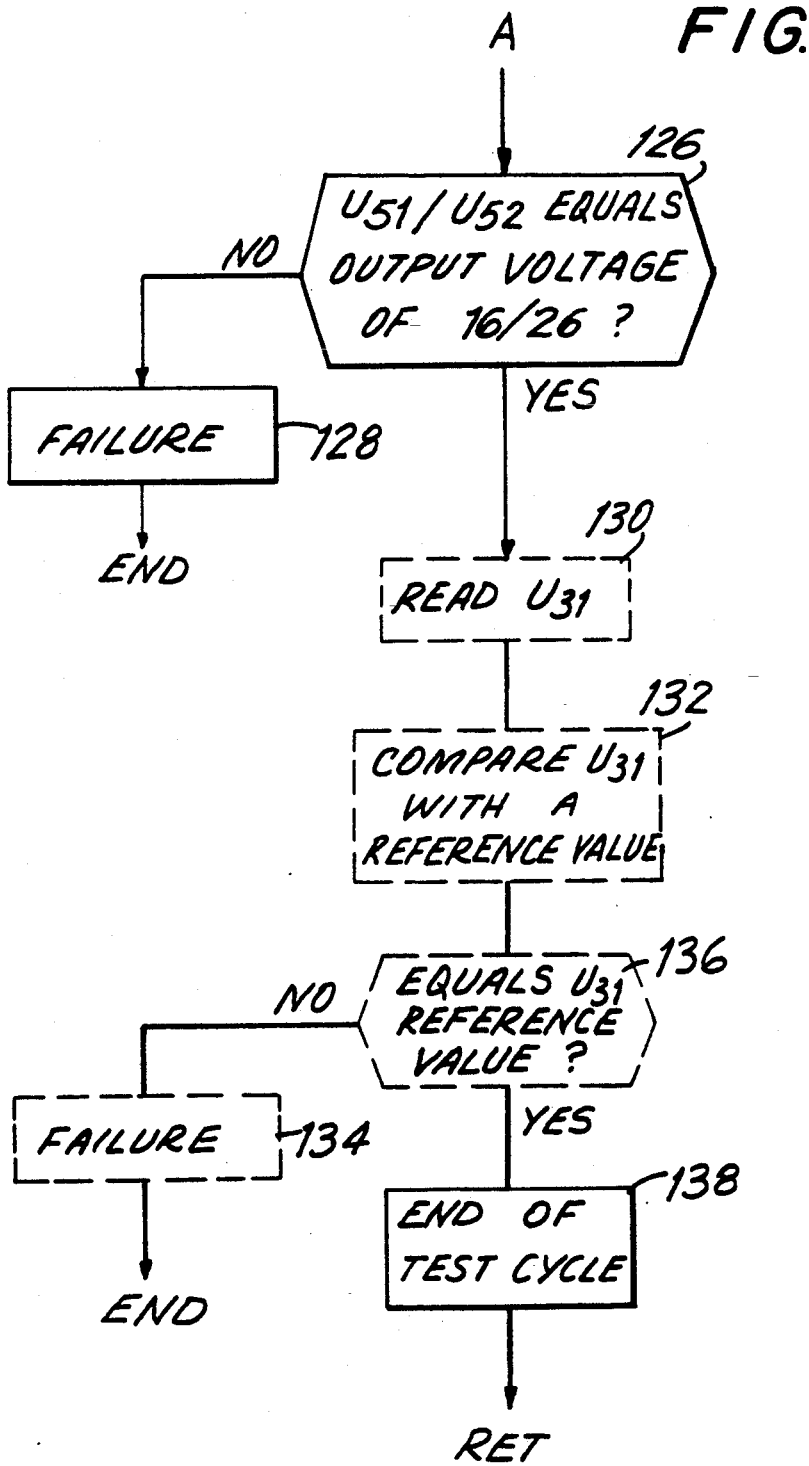

The function of the device according to the invention as shown in FIG. 1 will now be described with reference to the flow chart of FIGS. 3 and 4.

The supply controllers 16 and 26, from the on-board system bus 45, supply the transducer potentiometers 10 and 20 each with a fixed supply voltage $U_{13}$ and $U_{23}$, which as a rule are identical. The input of each supply controller is also supplied with the reference voltage $U_{Ref}$ that is applied to the node 30 from the reference voltage transfer stage 41 of the digital signal processing device 43.

In the operating status assumed for the present example, the output port 38A, via the line 39A and resistor 40, emits in program step 102, a control signal to the semiconductor switch 32, which switches on this semiconductor and thus causes the voltage $V_{31}$ at node 31 to approach the potential of ground 44—inasmuch as the resistor 33 performs only current-limiting functions and is therefore of low resistance in proportion to the resistance paths 11 and 21. The paths 11 and 21 of the transducer potentiometers 10 and 20 are thus at operating voltage, and the wiper voltages $U_{51}$ and $U_{52}$, if, read in program step 104, are always between the plausible voltage limit values $U_{13}$ or $U_{23}$ and $U_{31}$ at any time in operation provided that no errors are present, both in the static and dynamic state of the monitoring device, and unequivocally replicate the position of both the driving pedal and the element that varies the fuel metering quantity. In program step 106, values corresponding to $U_{13}$ and $U_{23}$ are constantly reproduced, or actual value thereof can be stored in memory in the processor 42 of the digital signal processing device 43; the processor 42 preferably monitors in program step 108 a plausibility window (or plausibility limits), standardized to reference voltage $U_{Ref}$, for allowable wiper voltages $U_{51}$ and $U_{52}$, taking the input/output conversion factors of the supply controllers 16 and 26 into consideration.

Whenever one of the two supply controllers 16 and 26 has failed completely, this is usually associated with an internal short-circuit to the on-board system bus 45 or to ground 44. In each case, the digital signal processing device 43 then recognizes, in program step 110 that the wiper voltage $U_{51}$ or $U_{52}$ associated with the corresponding supply controller output is outside plausibility limits. The processor 42 in program step 112 evaluates this discriminated situation as an error signal.

An implausible wiper voltage $U_{51}$ or $U_{52}$ also occurs with an intact supply controller 16 or 26 whenever a shunt to the supply terminal 13 or 23 to ground 44 or to the on-board system bus 45 is present, and the wiper 12 or 22 has a certain position. The processor 42 during the program step 110, 112 can then recognize and evaluate an error accordingly, even during operation.

In any case after a certain operating period, has elapsed in program step 114, in practice after approximately 1 to 20 ms, in the following program step 116 the semiconductor switch 32 is blocked by the processor 42 via the output 38A for the duration of a test interval. As a result, no further current flows through the resistance paths 11 and 21 of the transducer potentiometers 10 and 20, on the condition that no parasitic shunts are present. Thus the voltage drop between the wiper points or terminals 14 or 24 and the supply terminal 13 or 23 of the potentiometer 10 or 20 becomes zero, regardless of the instantaneous position of the wiper 12 or 22. Thus the wiper voltage $U_{51}$ or $U_{52}$ is identical to the output voltage $U_{13}$ or $U_{23}$ of the applicable supply controller 16 or 26.

As long as the wiper voltage an $U_{51}$ and $U_{52}$, in program step 118, are read out by the device 43 via the adaptation or matching amplifiers 18 and 28 and serve as a standard for the corresponding output voltages $U_{13}$ and $U_{23}$ of the supply controllers, either sufficiently precisely match a reference value programmed in read-only memory in the processor 42 or deviate from one another by an amount that is smaller than a maximum absolute deviation prescribed in program step 120, these wiper voltages are evaluated as correct by the processor 42; that is, the processor 42 does not find a current supply error, and in program step 124 the actual output voltages of the supply controllers 16 and 26 read out at the wiper terminals are applied in the processor 42 as new comparison reference values for the next test interval, standardized and stored in memory, of the processor 42. If corresponding comparison operations have a negative result, then in program step 127 the processor 42 does recognize errors and shifts the control loop to a failsafe state, which brings the vehicle to a stop in a controlled manner, in such a way that it is controllable by the driver at all times.

On the other hand, if a shunt is present at the wiper terminals 14 or 24 to ground 44 or to the on-board system bus 45, then in program step 126 (FIG. 4) during the test interval—that is, when the semiconductor switch 32 is opened—the corresponding wiper voltage $U_{51}$ or $U_{52}$ does not correspond to the output voltage of the supply controller 16 or 26. Corresponding comparison, operations in the step 126 of the processor 42 thus have a negative result leading in program step 128 to the shift of the control loop similarly as in the step 127. In particular, the comparison operations are negative for the possible range of positions of the wiper 12 or 22 in which, during the operation time when the semiconductor switch 32 is switched on, a plausibility test of the wiper voltage, $U_{51}$ or $U_{52}$ does not have a negative outcome.

Not only for safety reasons are the potentiometers 10 and 20 supplied not from a single supply controller but rather from two controllers 16 and 26 that as a rule are identical, such that each supply controller along with the associated potentiometer forms a separate measurement loop capable of functioning independently. The invention also makes use of the recognition that a shunt at two spatially separated potentiometers can hardly occur in the same manner and at the same time, just as two supply controllers are extremely unlikely to fail regularly at the same time. The invention also provides that the digital signal processing device 43 compares every wiper voltage in successive test intervals, in alternation, first with the output voltage measured in the same measurement branch and next with the output voltage measured in the other measurement branch for the applicable supply controller, and tests these for plausibility. As a result, by a plausibility comparison of a wiper voltage with reference to the measured supply voltage of the other measurement loop when the semiconductor switch 32 is closed and when the semiconductor switch 32 is opened, not only can a shunt error be distinguished from a defect of one supply controller, but an incorrect A/D input channel can also be recognized and isolated.

The adaptation or matching amplifiers 18 and 28 having corresponding input resistors 17 and 27 are not absolutely necessary for the function of the device according to the invention, but they are effective in order to reduce measurement errors caused by voltage drops and to attain increased security against malfunction of the device. Since the output voltage of the supply controller 16 and 26 can be made approximately identical to the internal reference voltage $U_{Ref}$ of the digital signal processing device 43, the adaptation amplifiers 18 and 28 can preferably have a gain near 1.

In program step 130, the adaptation amplifier 34 applies the voltage via line 35 into a third A/D channel 36C. In combination with a suitably dimensioned resistor 33, the adaptation amplifier 34 makes it possible for the digital signal processing device 43 to read in additional control values, in either the switched-on or off state of the semiconductor switch 32, or in other words both in the operating state and in the test state of the circuit arrangement. Operational safety is still further increased by the redundant monitoring of the current paths between elements 16- 13- 11- 15- 31- and 26- 21- 25- 31. If one of these paths is interrupted, for example by the failure of a supply controller having the effect of an open output or by an interruption at a transition from the resistor paths 11 or 21 to a terminal 13 or 15 or 23 or 25, then the current through the resistor 33 in the operating state of the device drops by approximately 50%, with the effect that the voltage $U_{31}$ also deviates significantly from a predeterminable comparison value range. In program steps 132 to 138, the processor 42 evaluates this voltage drop, suitably translated by the adaptation amplifier 34, as an error signal.

In the test state of the device, that is, with the semiconductor switch 32 opened, the digital signal processing device 43 can conclude, on the basis of identity or non-indentity of the voltages present on the input lines 19, 29 and 35, that there is freedom from error, or that there is a shunt or a defective supply controller.

The supply controller 16 or 26 which is also encompassed by the invention, in the embodiment of FIG. 2, fulfills the following function:

First, it decouples the associated transducer potentiometer 10 or 20 from the on-board system bus 45, which is subject to considerable voltage fluctuations and malfunctions, and as needed reproduces the reference voltage $U_{Ref}$ generated on-chip in the reference voltage transfer stage 41 of the digital signal processing device 43, at the output of the supply controller with increased current carrying capacity, yet short circuits—for example of the terminals 13 or 23 to ground 44 or to the on-board system bus 45—cannot have a destructive feedback effect upon the reference voltage transfer stage 41. Second, by the suitable selection of the voltage dividing resistors 51, 52, 53 and 54, an input/output translation factor $V < 1$ is attained for the reference voltage $U_{Ref}$ that is fed in; in a practical embodiment, this factor is defined by way of example at 0.95. However, an output voltage $U_{13}$ or $U_{23}$ of the supply controllers 16 and 26 that is less by 5 to 20% than the input voltage $U_{Ref}$ enables more-precise measurement of the output voltages of the supply controllers 16 and 26 via the A/D channels 36A and 36B, because of a thereby-dictated higher signal-to-noise ratio.

The current source 56 feeding the output node 57 enables intrinsically safe functioning of the supply controller according to the invention, in terms of short circuits or shunts at its output; in other words, the current source 56, which feeds a startup current into the output node 57, supplies the terminal 13 or 23 of the corresponding potentiometer 10 or 20. The operational amplifier 50 regulates the available current at the node 57 such that the desired supply voltage $U_{13}$ or $U_{23}$ is always present there, regardless of an allowable tolerance of the resistor path 11 or 21 of the potentiometers 10 or 20. The resistor 55 prevents the destruction of the operational amplifier 50 if because of an error an output node 57 is connected either to ground 44 or to the on-board system bus 45.

The device according to the invention thus, by static or continuously updated plausibility comparison of measurement values, which are retrieved by the same circuit arrangement alternating an operational state and at least one test state, thus attains the fastest possible recognition of error states with high instrinsic safety. It is readily apparent that this safety is attained by restricting additional components required solely for the monitoring and protection functions to a minimum number.

We claim:

1. An error monitoring device for an electronic control system in a motor vehicle which includes a potentiometer arranged as a set-point value transducer or an actual value transducer and a digital signal processing device, the monitoring device comprising: a supply controller assigned to said potentiometer to deliver a stable voltage thereto, electronic switching means arranged in series with said potentiometer, a digital signal processing device for periodically controlling the switching on and off states of said switching means to close or open current loops of said potentiometer, said digital signal processing device including A/D channels connected to a wiper terminal of the assigned potentiometer and to the supply terminals of said potentiometer to convert analog signals into corresponding digital data, and said digital signal processing device being programable for determining deviations of said digital data obtained during the switching-on state of said switching means when the current loop of said potentiometer is closed and a current flows through said potentiometer and during the switching-off state of said switching means when the current loop of said potentiometer is opened and no current flows, from predetermined reference data stored in memory to deliver output signals indicative of faults of said potentiometer.

2. An error monitoring device for an electronic control system in a motor vehicle which includes at least two potentiometer arranged as a set-point value transducer or an actual value transducer and a digital signal processing device, the monitoring device comprising: supply controllers assigned to said potentiometers to deliver a stable voltage thereto electronic switching means arranged in series with the said potentiometers, a digital signal processing device for periodically controlling the switching on and off states of said switching means to close or open current loops of said potentiometers, said digital signal processing device including A/D channels connected to each wiper terminal of an assigned potentiometer to the supply terminals of said potentiometers and to the other supply terminals to convert analog signals into corresponding digital data, and said digital signal processing device being programmable for determining deviations of said digital data obtained during the switching-on state of said switching means when the current loops of said potentiometers are closed and current flows through said potentiometers and during the switching-off state of said switching means when the current loops of said potentiometers are opened and no current flows from predetermined reference data stored in memory to deliver output signals indicative of faults in said potentiometers.

3. An error monitoring device for an electronic control system in a motor vehicle which includes a first potentiometer arranged as a set-point value transducer, a second potentiometer arranged as an actual value transducer and a digital signal processing device, the monitoring device comprising: two supply controllers each assigned to one of said potentiometers to deliver a stable supply voltage thereto; a semiconductor switch arranged in series with said potentiometers; a digital signal processing device for periodically controlling the switching on and off states of said semiconductor switch to close or open current loops of said potentiometers; said digital signal processing device including two A/D converting channels each connected to a wiper terminal of an assigned potentiometer to convert analog position signals at said wiper terminal into corresponding digital position data; said digital signal processing device being programmable for determining deviations of said digital position data obtained during the switching-on state of said semiconductor switch, from predetermined reference data stored in memory to deliver output signals indicative of errors in said electronic control system; a third A/D converting channel connected to a connection point of said semiconductor switch with ground terminals of said potentiometers to convert analog test potentials at said connection point into corresponding digital test data; said digital signal processing device being programable for determining deviations of said digital position data and test data obtained during different switching states of said semiconductor switch, from predetermined reference data stored in a memory to deliver output signals indicative of errors in said electronic control system; a first supply voltage ($U_{13}$) deliverable to the first potentiometer (10) from a first supply controller (16), and a second supply voltage ($U_{23}$) deliverable to the second potentiometer (20) from a second supply controller (26); a resistor (33) connected in series with the semiconductor switch (32), and a voltage drop ($U_{31}$) across this resistor (33) and the semiconductor switch (32) being applied to said third A/D converting channel (36C) of the digital signal processing device (43).

4. An error monitoring device for an electronic control system in a motor vehicle which includes a first potentiometer arranged as a set-point value transducer, a second potentiometer arranged as an actual value transducer and a digital signal processing device, the monitoring device comprising: two supply controllers each assigned to one of said potentiometers to deliver a stable supply voltage thereto; electronic switching means arranged in series with said potentiometers; a digital signal processing device for periodically controlling the switching on and off states of said switching means to close or open current loops of said potentiometers; said digital signal processing device including two A/D converting channels each connected to a wiper terminal of an assigned potentiometer to convert analog position signals at said wiper terminal into corresponding digital position data; said digital signal processing device being programable for determining deviations of said digital position data obtained during the switching-on state of said switching means, from predetermined reference data stored in memory to deliver output signals indicative of errors in said electronic control system; and a third A/D converting channel connected to a connection point of said switching means with ground terminals of said potentiometers to convert analog test potentials at said connection point into corresponding digital test data; and said digital signal processing device being programable for determining deviations of said digital position data and test data obtained during the different switching states of said switching means, from predetermined reference data stored in a memory to deliver output signals indicative of errors in said electronic control system.

5. A device as defined by claim 4, wherein a first supply voltage ($U_{13}$) is deliverable to the first potentiometer (10) from a first supply controller (16), and a second supply voltage ($U_{23}$) is deliverable to the second potentiometer (20) from a second supply controller (26).

6. A device as defined in claim 4, wherein said digital signal processing device includes a reference voltage transfer stage connected to inputs of the respective supply controllers to deliver a reference voltage ($V_{REF}$) thereto.

7. A device as defined in claim 6, further comprising a resistor connected in series with said switching means.

8. A device as defined in claim 7, wherein each of said supply controllers includes an amplifier and a current source connected between the output of the amplifier and an operating voltage terminal of the amplifier.

9. A device as defined in claim 8, wherein the reference voltage ($V_{REF}$) is delivered to inputs of said amplifiers.

10. A device as defined in claim 9, wherein at least one of said amplifiers has a gain of 1.

11. An error monitoring device for an electronic control system in a motor vehicle which includes a first potentiometer arranged as a set-point value transducer, a second potentiometer arranged as an actual value transducer and a digital signal processing device, the monitoring device comprising: two supply controllers each assigned to one of said potentiometers to deliver a stable supply voltage thereto; electronic switching means arranged in series with said potentiometers; a digital signal processing device for periodically controlling the switching on and off states of said switching means to close or open current loops of said potentiometers; said digital signal processing device including two A/D converting channels each connected to a wiper terminal of an assigned potentiometer to convert analog position signals at said wiper terminal into corresponding digital position data; and said digital signal processing device being programable for determining deviations of said digital position data obtained during the switching-on state of said switching means, from predetermined reference data stored in memory to deliver output signals indicative of errors in said electronic control system; and a third A/D converting channel connected to a connection point of said switching means with ground terminals of said potentiometers to convert analog test potentials at said connection point into corresponding digital test data; and said digital signal processing device being programable for determining deviations of said digital position data and test data obtained during the different switching states of said switching means, from predetermined reference data stored in a memory to deliver output signals indicative of errors in said electronic control system, the digital signal processing device, with the semiconductor switch closed for an operation time period, comparing each of the potentials ($U_{51}$, $U_{52}$) of said wiper terminals with predetermined lower and upper limit values stored in a memory and, with the semiconductor switch open for a test time period, comparing said potentials ($U_{51}$, $U_{52}$) for agreement with said stable supply voltage at the corresponding potentiometer, and if at least one of said potentials ($U_{51}$, $U_{52}$) is outside said limit values or in disagreement with said stable supply voltage, the digital signal processing device recognizing an error condition in said electronic control system.

12. A device as defined by claim 11, characterized in that lower and upper threshold values are definable in that corresponding values are storable in read-only memory in the digital signal processing device (43).

13. A device as defined in claim 11, wherein said lower and upper limit values are defined in that successive values corresponding to potentials ($U_{51}$ or $U_{52}$) at one of said wiper terminals during said test time periods, are stored in RAM in the digital signal processing device.

14. A device as defined by claim 13, wherein the digital signal processing device (43) alternately compares in successive test time periods, a tapped potential at the potentiometer (10 or 20) with the preceding tapped potential ($U_{S1}$ or $U_{S2}$) at the potentiometer (10 or 20) stored in memory in a preceding second time period.

15. A device as defined in claim 11, wherein the digital signal processing device (43), with the semiconductor switch (32) switched on, in first time periods, compares a value of the voltage drop ($U_{31}$) with a value of the voltage drop ($U_{31}$) with a value stored in read-only memory for agreement within predeterminable limits and, with the semiconductor switch (32) switched off in second time periods, compares the voltage drop ($U_{31}$) for agreement within predeterminable limits with the tapped potentials, and the detection of at least one of these voltages outside the predeterminable limits leads to the recognition and evaluation of an error state by the digital signal processing device (43).

16. A device as defined by claim 15, characterized in that the potentials ($U_{51}$, $U_{52}$) and/or the voltage drop values ($U_{31}$) are deliverable to the digital signal processing device (43) via adaptation amplifiers (18, 28, 34).

* * * * *